United States Patent
Bullotta et al.

(10) Patent No.: US 10,025,880 B2
(45) Date of Patent: Jul. 17, 2018

(54) METHODS FOR INTEGRATING SEMANTIC SEARCH, QUERY, AND ANALYSIS AND DEVICES THEREOF

(71) Applicant: PTC Inc., Needham, MA (US)

(72) Inventors: Rick Bullotta, Phoenixville, PA (US); John Schaefer, Ambler, PA (US)

(73) Assignee: PTC Inc., Needham, MA (US)

( * ) Notice: Subject to any disclaimer, the term of this patent is extended or adjusted under 35 U.S.C. 154(b) by 0 days.

(21) Appl. No.: 15/400,230

(22) Filed: Jan. 6, 2017

(65) Prior Publication Data
US 2017/0242934 A1    Aug. 24, 2017

Related U.S. Application Data

(63) Continuation of application No. 13/679,361, filed on Nov. 16, 2012, now Pat. No. 9,576,046.
(Continued)

(51) Int. Cl.
*G06F 17/30* (2006.01)
*G06Q 10/06* (2012.01)

(52) U.S. Cl.
CPC .... *G06F 17/30991* (2013.01); *G06F 17/3056* (2013.01); *G06F 17/30637* (2013.01);
(Continued)

(58) Field of Classification Search
CPC ......... G06F 17/30991; G06F 17/30867; G06F 17/30637; G06F 17/30864
(Continued)

(56) References Cited

U.S. PATENT DOCUMENTS 3,656,112 A    4/1972    Paull
3,916,412 A    10/1975   Amoroso, Jr.
(Continued)

FOREIGN PATENT DOCUMENTS

EP    0497010 A2    8/1992
EP    1187015 A2    3/2002
(Continued)

OTHER PUBLICATIONS

International Search Report and Written Opinion issued in related International Application No. PCT/US2015/021882 dated Jul. 30, 2015.
(Continued)

*Primary Examiner* — Shahid Alam
(74) *Attorney, Agent, or Firm* — Meunier Carlin & Curfman LLC (57) ABSTRACT

A method, non-transitory computer readable medium and data management computing apparatus comprising searching across a plurality of different heterogeneous data indexes based on portions of one or more search keywords in response to a received request. A result set for each of the plurality of different heterogeneous data indexes is obtained based on the searching. Further, one or more facets to each of the obtained results sets are added. Furthermore, a plurality of visualization techniques are automatically identified for each of the obtained results sets based on the facets in each of the obtained result sets and a model entity type associated with each of the plurality of different heterogeneous data indexes. Finally, each of the obtained results sets with the added facets and the identified one of the plurality of visualization techniques is provided.

20 Claims, 3 Drawing Sheets

Related U.S. Application Data (60) Provisional application No. 61/560,369, filed on Nov. 16, 2011.

(52) U.S. Cl.
CPC .. *G06F 17/30864* (2013.01); *G06F 17/30867* (2013.01); *G06Q 10/0631* (2013.01)

(58) Field of Classification Search
USPC .......................................................... 707/722
See application file for complete search history.

(56) References Cited

U.S. PATENT DOCUMENTS

| | | | |
|---|---|---|---|
| 3,983,484 A | 9/1976 | Hodama | |
| 4,063,173 A | 12/1977 | Nelson et al. | |
| 4,103,250 A | 7/1978 | Jackson | |
| 4,134,068 A | 1/1979 | Richardson | |
| 4,216,546 A | 8/1980 | Litt | |
| 4,554,668 A | 11/1985 | Denman et al. | |
| 4,601,059 A | 7/1986 | Gammenthaler | |
| 4,680,582 A | 7/1987 | Mejia | |
| 4,704,585 A | 11/1987 | Lind | |
| 4,887,204 A | 12/1989 | Johnson et al. | |
| 4,979,170 A | 12/1990 | Gilhousen et al. | |
| 5,113,416 A | 5/1992 | Lindell | |
| 5,134,615 A | 7/1992 | Freeburg et al. | |
| 5,159,704 A | 10/1992 | Pirolli et al. | |
| 5,276,703 A | 1/1994 | Budin et al. | |
| 5,361,401 A | 11/1994 | Pirillo | |
| 5,422,889 A | 6/1995 | Sevenhans et al. | |
| 5,454,010 A | 9/1995 | Leveque | |
| 5,479,441 A | 12/1995 | Tymes et al. | |
| 5,493,671 A | 2/1996 | Pitt et al. | |
| 5,515,365 A | 5/1996 | Summer et al. | |
| 5,734,966 A | 3/1998 | Farrer et al. | |
| 5,737,609 A | 4/1998 | Reed et al. | |
| 5,805,442 A | 9/1998 | Crater et al. | |
| 5,892,962 A | 4/1999 | Cloutier | |
| 5,909,640 A | 6/1999 | Farrer et al. | |
| 5,925,100 A | 7/1999 | Drewry et al. | |
| 6,169,992 B1 | 1/2001 | Beall et al. | |
| 6,182,252 B1 | 1/2001 | Wong et al. | |
| 6,198,480 B1 | 3/2001 | Cotugno et al. | |
| 6,377,162 B1 | 4/2002 | Delestienne et al. | |
| 6,430,602 B1 | 8/2002 | Kay et al. | |
| 6,473,788 B1 | 10/2002 | Kim et al. | |
| 6,510,350 B1 | 1/2003 | Steen, III et al. | |
| 6,553,405 B1 | 4/2003 | Desrochers | |
| 6,570,867 B1 | 5/2003 | Robinson et al. | |
| 6,618,709 B1 | 9/2003 | Sneeringer | |
| 6,675,193 B1 | 1/2004 | Slavin et al. | |
| 6,757,714 B1 | 6/2004 | Hansen | |
| 6,766,361 B1 | 7/2004 | Venigalla | |
| 6,797,921 B1 | 9/2004 | Niedereder et al. | |
| 6,810,522 B2 | 10/2004 | Cook et al. | |
| 6,813,587 B2 | 11/2004 | McIntyre et al. | |
| 6,850,255 B2 | 2/2005 | Muschetto | |
| 6,859,757 B2 | 2/2005 | Muehl et al. | |
| 6,915,330 B2 | 7/2005 | Hardy et al. | |
| 6,947,959 B1 * | 9/2005 | Gill ................... | G06F 17/30011 707/999.003 |
| 6,980,558 B2 | 12/2005 | Aramoto | |
| 6,993,555 B2 | 1/2006 | Kay et al. | |
| 7,031,520 B2 | 4/2006 | Tunney | |
| 7,046,134 B2 | 5/2006 | Hansen | |
| 7,047,159 B2 | 5/2006 | Muehl et al. | |
| 7,054,922 B2 | 5/2006 | Kinney et al. | |
| 7,082,383 B2 | 7/2006 | Baust et al. | |
| 7,082,460 B2 | 7/2006 | Hansen et al. | |
| 7,117,239 B1 | 10/2006 | Hansen | |
| 7,149,792 B1 | 12/2006 | Hansen et al. | |
| 7,155,466 B2 * | 12/2006 | Rodriguez ........ | G06F 17/30073 707/694 |
| 7,178,149 B2 | 2/2007 | Hansen | |
| 7,185,014 B1 | 2/2007 | Hansen | |
| 7,200,613 B2 * | 4/2007 | Schlonski ............. | H04L 41/12 |
| 7,250,892 B2 | 7/2007 | Bornhoevd et al. | |
| 7,254,601 B2 | 8/2007 | Baller et al. | |
| 7,269,732 B2 | 9/2007 | Kilian-Kehr | |
| 7,296,025 B2 * | 11/2007 | Kung ................. | G06F 17/3089 707/608 |
| 7,321,686 B2 | 1/2008 | Shibata et al. | |
| 7,341,197 B2 | 3/2008 | Muehl et al. | |
| 7,380,236 B2 | 5/2008 | Hawley | |
| 7,386,535 B1 * | 6/2008 | Kalucha ................. | G06Q 10/06 |
| 7,496,911 B2 | 2/2009 | Rowley et al. | |
| 7,529,570 B2 | 5/2009 | Shirota | |
| 7,529,750 B2 | 5/2009 | Bair | |
| 7,536,673 B2 | 5/2009 | Brendle et al. | |
| 7,555,355 B2 | 6/2009 | Meyer | |
| 7,566,005 B2 | 7/2009 | Heusermann et al. | |
| 7,570,755 B2 | 8/2009 | Williams et al. | |
| 7,587,251 B2 | 9/2009 | Hopsecger | |
| 7,591,006 B2 | 9/2009 | Werner | |
| 7,593,917 B2 | 9/2009 | Werner | |
| 7,613,290 B2 | 11/2009 | Williams et al. | |
| 7,616,642 B2 | 11/2009 | Anke et al. | |
| 7,617,198 B2 | 11/2009 | Durvasula | |
| 7,624,092 B2 | 11/2009 | Lieske et al. | |
| 7,624,371 B2 | 11/2009 | Kulkarni et al. | |
| 7,644,120 B2 | 1/2010 | Todorov et al. | |
| 7,644,129 B2 | 1/2010 | Videlov | |
| 7,647,407 B2 | 1/2010 | Omshehe et al. | |
| 7,653,902 B2 | 1/2010 | Bozak et al. | |
| 7,673,141 B2 | 3/2010 | Killian-Kehr et al. | |
| 7,684,621 B2 | 3/2010 | Tunney | |
| 7,685,207 B1 * | 3/2010 | Helms ................... | G06Q 10/06 707/790 |
| 7,703,024 B2 | 4/2010 | Kautzleban et al. | |
| 7,707,550 B2 | 4/2010 | Resnick et al. | |
| 7,725,815 B2 | 5/2010 | Peters | |
| 7,728,838 B2 | 6/2010 | Forney et al. | |
| 7,730,498 B2 | 6/2010 | Resnick et al. | |
| 7,743,015 B2 | 6/2010 | Schmitt | |
| 7,743,155 B2 | 6/2010 | Pisharody et al. | |
| 7,650,607 B2 | 7/2010 | Resnick et al. | |
| 7,752,335 B2 | 7/2010 | Boxenhorn | |
| 7,757,234 B2 | 7/2010 | Krebs | |
| 7,761,354 B2 | 7/2010 | Kling et al. | |
| 7,765,181 B2 * | 7/2010 | Thomas ................. | G06F 9/4451 707/999.01 |
| 7,774,369 B2 | 8/2010 | Herzog et al. | |
| 7,779,089 B2 | 8/2010 | Hessmer et al. | |
| 7,779,383 B2 | 8/2010 | Bornhoevd et al. | |
| 7,783,984 B2 | 8/2010 | Roediger et al. | |
| 7,802,238 B2 | 9/2010 | Clinton | |
| 7,814,044 B2 | 10/2010 | Schwerk | |
| 7,814,208 B2 | 10/2010 | Stephenson et al. | |
| 7,817,039 B2 | 10/2010 | Bornhoevd et al. | |
| 7,827,169 B2 | 11/2010 | Enenkiel | |
| 7,831,600 B2 | 11/2010 | Kilian | |
| 7,840,701 B2 | 11/2010 | Hsu et al. | |
| 7,852,861 B2 | 12/2010 | Wu et al. | |
| 7,853,241 B1 | 12/2010 | Harrison | |
| 7,853,924 B2 | 12/2010 | Curran | |
| 7,860,968 B2 | 12/2010 | Bornhoevd et al. | |
| 7,865,442 B1 | 1/2011 | Sowell | |
| 7,865,731 B2 | 1/2011 | Kilian-Kehr | |
| 7,865,939 B2 | 1/2011 | Schuster | |
| 7,873,666 B2 | 1/2011 | Sauermann | |
| 7,877,412 B2 * | 1/2011 | Homer ................... | G06F 21/10 707/716 |
| 7,882,148 B2 | 2/2011 | Werner et al. | |
| 7,886,278 B2 | 2/2011 | Stulski | |
| 7,890,388 B2 | 2/2011 | Mariotti | |
| 7,890,568 B2 | 2/2011 | Belenki | |
| 7,895,115 B2 | 2/2011 | Bayyapu et al. | |
| 7,899,777 B2 | 3/2011 | Bailer et al. | |
| 7,899,803 B2 | 3/2011 | Cotter et al. | |
| 7,908,278 B2 | 3/2011 | Akkiraju et al. | |
| 7,917,629 B2 | 3/2011 | Werner | |
| 7,921,137 B2 | 4/2011 | Lieske et al. | |
| 7,925,979 B2 | 4/2011 | Forney et al. | |

(56) References Cited

U.S. PATENT DOCUMENTS

| | | |
|---|---|---|
| 7,937,370 B2 | 5/2011 | Hansen |
| 7,937,408 B2 | 5/2011 | Stuhec |
| 7,937,422 B1 * | 5/2011 | Ferguson, Jr. .... G06F 17/30029 707/828 |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |
| 8,065,342 B1 * | 11/2011 | Borg .................. G06Q 10/06 455/456.1 |
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 | 1/2012 | Hansen |
| 8,126,903 B2 | 2/2012 | Lehmann et al. |
| 8,127,237 B2 | 2/2012 | Beringer |
| 8,131,694 B2 | 3/2012 | Bender et al. |
| 8,131,838 B2 | 3/2012 | Bornhoevd et al. |
| 8,136,034 B2 | 3/2012 | Stanton et al. |
| 8,145,468 B2 | 3/2012 | Fritzdche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |
| 8,156,473 B2 | 4/2012 | Heidasch |
| 8,183,995 B2 | 5/2012 | Wang et al. |
| 8,190,708 B1 | 5/2012 | Short et al. |
| 8,229,944 B2 | 7/2012 | Latzina et al. |
| 8,230,333 B2 | 7/2012 | Decherd et al. |
| 8,249,906 B2 | 8/2012 | Ponce de Leon |
| 8,250,169 B2 | 8/2012 | Beringer et al. |
| 8,254,249 B2 | 8/2012 | Wen et al. |
| 8,261,193 B1 | 9/2012 | Alur et al. |
| 8,271,935 B2 | 9/2012 | Lewis |
| 8,280,009 B2 | 10/2012 | Stepanian |
| 8,284,033 B2 | 10/2012 | Moran |
| 8,285,807 B2 | 10/2012 | Slavin et al. |
| 8,291,039 B2 | 10/2012 | Shedrinsky |
| 8,291,475 B2 | 10/2012 | Jackson et al. |
| 8,296,198 B2 | 10/2012 | Bhatt et al. |
| 8,296,266 B2 | 10/2012 | Lehmann et al. |
| 8,296,413 B2 | 10/2012 | Bornhoevd et al. |
| 8,301,770 B2 | 10/2012 | Van Coppenolle et al. |
| 8,306,635 B2 | 11/2012 | Pryor |
| 8,312,383 B2 | 11/2012 | Gilfix |
| 8,321,790 B2 | 11/2012 | Sherrill et al. |
| 8,321,792 B1 | 11/2012 | Alur et al. |
| 8,331,855 B2 | 12/2012 | Williams et al. |
| 8,346,520 B2 | 1/2013 | Lu et al. |
| 8,359,116 B2 | 1/2013 | Manthey |
| 8,364,300 B2 | 1/2013 | Pouyez et al. |
| 8,370,479 B2 | 2/2013 | Hart et al. |
| 8,370,826 B2 | 2/2013 | Johnson et al. |
| 8,375,292 B2 | 2/2013 | Coffman et al. |
| 8,375,362 B1 | 2/2013 | Brette et al. |
| RE44,110 E | 3/2013 | Venigalla |
| 8,392,116 B2 | 3/2013 | Lehmann et al. |
| 8,392,561 B1 | 3/2013 | Dyer et al. |
| 8,396,929 B2 | 3/2013 | Helfman et al. |
| 8,397,056 B1 | 3/2013 | Malks et al. |
| 8,406,119 B2 | 3/2013 | Taylor et al. |
| 8,412,579 B2 | 4/2013 | Gonzalez |
| 8,417,764 B2 | 4/2013 | Fletcher et al. |
| 8,417,854 B2 | 4/2013 | Weng et al. |
| 8,423,418 B2 | 4/2013 | Hald et al. |
| 8,424,058 B2 | 4/2013 | Vinogradov et al. |
| 8,433,664 B2 | 4/2013 | Ziegler et al. |
| 8,433,815 B2 | 4/2013 | Van Coppenolle et al. |
| 8,438,132 B1 | 5/2013 | Dziuk et al. |
| 8,442,933 B2 | 5/2013 | Baier et al. |
| 8,442,999 B2 | 5/2013 | Gorelik et al. |
| 8,443,069 B2 | 5/2013 | Bagepalli et al. |
| 8,443,071 B2 | 5/2013 | Lu et al. |
| 8,457,996 B2 | 6/2013 | Winkler et al. |
| 8,458,189 B1 | 6/2013 | Ludwig et al. |
| 8,458,315 B2 | 6/2013 | Miche et al. |
| 8,458,596 B1 | 6/2013 | Malks et al. |
| 8,458,600 B2 | 6/2013 | Dheap et al. |
| 8,473,317 B2 | 6/2013 | Santoso et al. |
| 8,478,861 B2 | 7/2013 | Taylor et al. |
| 8,484,156 B2 | 7/2013 | Hancsarik et al. |
| 8,489,527 B2 | 7/2013 | Van Coppenolle et al. |
| 8,490,047 B2 | 7/2013 | Petschnigg et al. |
| 8,490,876 B2 | 7/2013 | Tan et al. |
| 8,495,072 B1 | 7/2013 | Kapoor et al. |
| 8,495,511 B2 | 7/2013 | Redpath |
| 8,495,683 B2 | 7/2013 | Van Coppenolle et al. |
| 8,516,296 B2 | 8/2013 | Mendu |
| 8,516,383 B2 | 8/2013 | Bryant et al. |
| 8,521,621 B1 | 8/2013 | Hetzer et al. |
| 8,522,217 B2 | 8/2013 | Dutta et al. |
| 8,522,341 B2 | 8/2013 | Nochta et al. |
| 8,532,008 B2 | 9/2013 | Das et al. |
| 8,533,660 B2 | 9/2013 | Mehr et al. |
| 8,538,799 B2 | 9/2013 | Haller et al. |
| 8,543,568 B2 | 9/2013 | Wagenblatt |
| 8,547,838 B2 | 10/2013 | Lee et al. |
| 8,549,157 B2 | 10/2013 | Schnellbaecher |
| 8,555,248 B2 | 10/2013 | Brunswig et al. |
| 8,560,636 B2 | 10/2013 | Kieselbach |
| 8,560,713 B2 | 10/2013 | de Souza et al. |
| 8,566,193 B2 | 10/2013 | Singh et al. |
| 8,571,908 B2 | 10/2013 | Li et al. |
| 8,572,107 B2 | 10/2013 | Fan et al. |
| 8,577,904 B2 | 11/2013 | Marston |
| 8,578,059 B2 | 11/2013 | Odayappan et al. |
| 8,578,328 B2 | 11/2013 | Kamiyama et al. |
| 8,578,330 B2 | 11/2013 | Dreiling et al. |
| 8,584,082 B2 | 11/2013 | Baird et al. |
| 8,588,765 B1 | 11/2013 | Harrison |
| 8,594,023 B2 | 11/2013 | He et al. |
| 8,635,254 B2 | 1/2014 | Harvey et al. |
| 8,689,181 B2 | 4/2014 | Biron, III |
| 8,752,074 B2 | 6/2014 | Hansen |
| 8,762,497 B2 | 6/2014 | Hansen |
| 8,769,095 B2 | 7/2014 | Hart et al. |
| 8,788,632 B2 | 7/2014 | Taylor et al. |
| 8,898,294 B2 | 11/2014 | Hansen |
| 9,002,980 B2 | 4/2015 | Shedrinsky |
| 2002/0099454 A1 | 7/2002 | Gerrity |
| 2002/0138596 A1 | 9/2002 | Darwin et al. |
| 2003/0005163 A1 | 1/2003 | Belzile |
| 2003/0093710 A1 | 5/2003 | Hashimoto et al. |
| 2003/0117280 A1 | 6/2003 | Prehn |
| 2004/0027376 A1 | 2/2004 | Calder et al. |
| 2004/0133635 A1 | 7/2004 | Spriestersbach et al. |
| 2004/0158455 A1 | 8/2004 | Spivack et al. |
| 2004/0158629 A1 | 8/2004 | Herbeck et al. |
| 2004/0177124 A1 | 9/2004 | Hansen |
| 2005/0015369 A1 | 1/2005 | Styles et al. |
| 2005/0021506 A1 | 1/2005 | Sauermann et al. |
| 2005/0027675 A1 | 2/2005 | Schmitt et al. |
| 2005/0060186 A1 | 3/2005 | Blowers et al. |
| 2005/0102362 A1 | 5/2005 | Price et al. |
| 2005/0198137 A1 | 9/2005 | Pavlik et al. |

(56) References Cited

U.S. PATENT DOCUMENTS

| | | |
|---|---|---|
| 2005/0213563 A1 | 9/2005 | Shaffer et al. |
| 2005/0240427 A1 | 10/2005 | Crichlow |
| 2005/0289154 A1 | 12/2005 | Weiss et al. |
| 2006/0031520 A1 | 2/2006 | Bedekar et al. |
| 2006/0186986 A1 | 8/2006 | Ma et al. |
| 2006/0208871 A1 | 9/2006 | Hansen |
| 2007/0005736 A1 | 1/2007 | Hansen et al. |
| 2007/0016557 A1 | 1/2007 | Moore et al. |
| 2007/0027854 A1 | 2/2007 | Rao et al. |
| 2007/0027914 A1 | 2/2007 | Agiwal |
| 2007/0104180 A1 | 5/2007 | Aizu et al. |
| 2007/0162486 A1 | 7/2007 | Brueggemann et al. |
| 2007/0174158 A1 | 7/2007 | Bredehoeft et al. |
| 2007/0260593 A1 | 11/2007 | Delvat |
| 2007/0266384 A1 | 11/2007 | Labrou et al. |
| 2007/0300172 A1 | 12/2007 | Runge et al. |
| 2008/0098085 A1 | 4/2008 | Krane et al. |
| 2008/0172632 A1 | 7/2008 | Stambaugh |
| 2008/0208890 A1 | 8/2008 | Milam |
| 2008/0222599 A1 | 9/2008 | Nathan et al. |
| 2008/0231414 A1 | 9/2008 | Canosa |
| 2008/0244077 A1 | 10/2008 | Canosa |
| 2008/0244594 A1 | 10/2008 | Chen et al. |
| 2008/0255782 A1 | 10/2008 | Bilac et al. |
| 2008/0319947 A1 | 12/2008 | Latzina et al. |
| 2009/0006391 A1 | 1/2009 | Ram |
| 2009/0150431 A1 | 6/2009 | Schmidt et al. |
| 2009/0193148 A1 | 7/2009 | Jung et al. |
| 2009/0259442 A1 | 10/2009 | Gandikota et al. |
| 2009/0265760 A1 | 10/2009 | Zhu et al. |
| 2009/0299990 A1 | 12/2009 | Setlur et al. |
| 2009/0300060 A1 | 12/2009 | Beringer et al. |
| 2009/0300417 A1 | 12/2009 | Bonissone et al. |
| 2009/0319518 A1 | 12/2009 | Koudas et al. |
| 2009/0327337 A1 | 12/2009 | Lee et al. |
| 2010/0017379 A1 | 1/2010 | Naibo et al. |
| 2010/0017419 A1 | 1/2010 | Francis et al. |
| 2010/0064277 A1 | 3/2010 | Baird et al. |
| 2010/0077001 A1 | 3/2010 | Vogel et al. |
| 2010/0094843 A1 | 4/2010 | Cras |
| 2010/0125584 A1 | 5/2010 | Navas |
| 2010/0125826 A1 | 5/2010 | Rice et al. |
| 2010/0250440 A1 | 9/2010 | Wang et al. |
| 2010/0257242 A1 | 10/2010 | Morris |
| 2010/0286937 A1 | 11/2010 | Hedley et al. |
| 2010/0287075 A1 | 11/2010 | Herzog et al. |
| 2010/0293360 A1 | 11/2010 | Schoop et al. |
| 2011/0035188 A1 | 2/2011 | Martinez-Heras et al. |
| 2011/0078599 A1 | 3/2011 | Guertler et al. |
| 2011/0078600 A1 | 3/2011 | Guertler et al. |
| 2011/0099190 A1 | 4/2011 | Kreibe |
| 2011/0137883 A1 | 6/2011 | Lagad et al. |
| 2011/0138354 A1 | 6/2011 | Hertenstein et al. |
| 2011/0145712 A1 | 6/2011 | Pontier et al. |
| 2011/0145933 A1 | 6/2011 | Gambhir et al. |
| 2011/0153505 A1 | 6/2011 | Brunswig et al. |
| 2011/0154226 A1 | 6/2011 | Guertler et al. |
| 2011/0161409 A1 | 6/2011 | Nair et al. |
| 2011/0173203 A1 | 7/2011 | Jung et al. |
| 2011/0173220 A1 | 7/2011 | Jung et al. |
| 2011/0173264 A1 | 7/2011 | Kelly |
| 2011/0208788 A1 | 8/2011 | Heller et al. |
| 2011/0209069 A1 | 8/2011 | Mohler |
| 2011/0219327 A1 | 9/2011 | Middleton, Jr. et al. |
| 2011/0231592 A1 | 9/2011 | Bleier et al. |
| 2011/0276360 A1 | 11/2011 | Barth et al. |
| 2011/0307295 A1 | 12/2011 | Steiert et al. |
| 2011/0307363 A1 | 12/2011 | N et al. |
| 2011/0307405 A1 | 12/2011 | Hammer et al. |
| 2011/0320525 A1 | 12/2011 | Agarwal et al. |
| 2012/0005577 A1 | 1/2012 | Chakra et al. |
| 2012/0059856 A1 | 3/2012 | Kreibe et al. |
| 2012/0072435 A1 | 3/2012 | Han |
| 2012/0072885 A1 | 3/2012 | Taragin et al. |
| 2012/0078959 A1 | 3/2012 | Cho et al. |
| 2012/0096429 A1 | 4/2012 | Desari et al. |
| 2012/0117051 A1 | 5/2012 | Liu et al. |
| 2012/0131473 A1 | 5/2012 | Biron, III |
| 2012/0136649 A1 | 5/2012 | Freising et al. |
| 2012/0143970 A1 | 6/2012 | Hansen |
| 2012/0144370 A1 | 6/2012 | Kemmler et al. |
| 2012/0150859 A1 | 6/2012 | Hu |
| 2012/0158825 A1 | 6/2012 | Ganser |
| 2012/0158914 A1 | 6/2012 | Hansen |
| 2012/0166319 A1 | 6/2012 | Deledda et al. |
| 2012/0167006 A1 | 6/2012 | Tillert et al. |
| 2012/0173671 A1 | 7/2012 | Callaghan et al. |
| 2012/0179905 A1 | 7/2012 | Ackerly |
| 2012/0197488 A1 | 8/2012 | Lee et al. |
| 2012/0197852 A1 | 8/2012 | Dutta et al. |
| 2012/0197856 A1 | 8/2012 | Banka et al. |
| 2012/0197898 A1 | 8/2012 | Pandey et al. |
| 2012/0197911 A1 | 8/2012 | Banka et al. |
| 2012/0239381 A1 | 9/2012 | Heidasch |
| 2012/0239606 A1 | 9/2012 | Heidasch |
| 2012/0254825 A1 | 10/2012 | Sharma et al. |
| 2012/0259932 A1 | 10/2012 | Kang et al. |
| 2012/0284259 A1 | 11/2012 | Jehuda |
| 2012/0311501 A1 | 12/2012 | Nonez et al. |
| 2012/0311526 A1 | 12/2012 | DeAnna et al. |
| 2012/0311547 A1 | 12/2012 | DeAnna et al. |
| 2012/0324066 A1 | 12/2012 | Alam et al. |
| 2013/0006400 A1 | 1/2013 | Caceres et al. |
| 2013/0036137 A1 | 2/2013 | Ollis et al. |
| 2013/0054563 A1 | 2/2013 | Heidasch |
| 2013/0060791 A1 | 3/2013 | Szalwinski et al. |
| 2013/0067031 A1 | 3/2013 | Shedrinsky |
| 2013/0067302 A1 | 3/2013 | Chen et al. |
| 2013/0073969 A1 | 3/2013 | Blank et al. |
| 2013/0080898 A1 | 3/2013 | Lavian et al. |
| 2013/0110496 A1 | 5/2013 | Heidasch |
| 2013/0110861 A1 | 5/2013 | Roy et al. |
| 2013/0124505 A1 | 5/2013 | Bullotta et al. |
| 2013/0124616 A1 | 5/2013 | Bullotta et al. |
| 2013/0125053 A1 | 5/2013 | Brunswig et al. |
| 2013/0132385 A1 | 5/2013 | Bullotta et al. |
| 2013/0166563 A1 | 6/2013 | Mueller et al. |
| 2013/0166568 A1 | 6/2013 | Binkert et al. |
| 2013/0166569 A1 | 6/2013 | Navas |
| 2013/0173062 A1 | 7/2013 | Koenig-Richardson |
| 2013/0179565 A1 | 7/2013 | Hart et al. |
| 2013/0185593 A1 | 7/2013 | Taylor et al. |
| 2013/0185786 A1 | 7/2013 | Dyer et al. |
| 2013/0191767 A1 | 7/2013 | Peters et al. |
| 2013/0207980 A1 | 8/2013 | Ankisettipalli et al. |
| 2013/0211555 A1 | 8/2013 | Lawson et al. |
| 2013/0290441 A1 | 8/2013 | Linden Levy |
| 2013/0246897 A1 | 9/2013 | O'Donnell |
| 2013/0262641 A1 | 10/2013 | Zur et al. |
| 2013/0275344 A1 | 10/2013 | Heidasch |
| 2013/0275550 A1 | 10/2013 | Lee et al. |
| 2013/0304581 A1 | 11/2013 | Soroca et al. |
| 2014/0016455 A1 | 1/2014 | Ruetschi et al. |
| 2014/0019432 A1 | 1/2014 | Lunenfeld |
| 2014/0032531 A1 | 1/2014 | Ravi et al. |
| 2014/0040286 A1 | 2/2014 | Bane |
| 2014/0040433 A1 | 2/2014 | Russell, Jr. et al. |
| 2014/0095211 A1 | 4/2014 | Gloerstad et al. |
| 2014/0164358 A1 | 6/2014 | Benzatti |
| 2014/0223334 A1 | 8/2014 | Jensen et al. |
| 2014/0282370 A1 | 9/2014 | Schaefer et al. |
| 2015/0007199 A1 | 1/2015 | Valeva et al. |
| 2015/0058833 A1 | 2/2015 | Venkata Naga Ravi |
| 2015/0271109 A1 | 9/2015 | Bullotta et al. |
| 2015/0271229 A1 | 9/2015 | Bullotta et al. |

(56) References Cited

U.S. PATENT DOCUMENTS

2015/0271271 A1 9/2015 Bullotta et al.
2015/0271295 A1 9/2015 Mahoney et al.
2015/0271301 A1 9/2015 Mahoney et al.

FOREIGN PATENT DOCUMENTS

| WO | 9921152 A1 | 4/1999 |
| WO | 0077592 A2 | 12/2000 |
| WO | 2008115995 A1 | 9/2008 |
| WO | 2014145084 A1 | 9/2014 |

OTHER PUBLICATIONS

International Search Report and Written Opinion issued in related International Application No. PCT/US2015/021867 dated Jul. 31, 2015.
Hart Server, retrieved from 2001 internet archive of hartcomm.org http://www.hartcomm.org/server2/index.html, 13 pages (2001).
Ray, Learning XML, first edition, 277 pages (2001)—part 1—p. 1-146 Ray, Learning XML, first edition, 277 pages (2001)—part 2—p. 147-277.
Shi, L. et al., Understanding Text Corpora with Multiple Facets, IEEE Symposium on Visual Analytics Science and Technoloqy (VAST), 99-106 (2010).

* cited by examiner

FIG. 2B

METHODS FOR INTEGRATING SEMANTIC SEARCH, QUERY, AND ANALYSIS AND DEVICES THEREOF

This is a continuation application of U.S. patent application Ser. No. 13/679,361, filed Nov. 16, 2012, which claims priority to, and the benefit of, U.S. Provisional Patent Application Ser. No. 61/560,369 filed Nov. 16, 2011, each of which is hereby incorporated by reference in its entirety.

FIELD

This technology generally relates to the collection, semantic modeling, persistent storage, and subsequent search, query and analysis of vast amount of heterogeneous data that is derived from computer applications and systems, computer and network based human interactions, and networked physical devices, sensors and systems.

BACKGROUND

The connected world, also referred to as the internet of things, is growing quickly. Analysts have estimated that along with the continued growth of humans using the Internet, the number of connected devices and systems will rise from five billion to one trillion in the next ten years. However, the traditional ways to manage and communicate with these systems has not changed. In other words, all the information from these systems is not accessible or is not able to be correlated in a way that helps people or businesses do their jobs better and more efficiently, find information they are looking for in the proper context, or make this data consumable in a meaningful way. In addition, user expectations for interacting with systems have changed and more consistent ways to share dynamic information in this environment have not been found.

Existing technologies handle the rising amount of data using enterprise resource planning (ERP) systems, portals and related technologies, traditional business intelligence systems and manufacturing intelligence systems. However, these existing technologies do not provide the required data in real time and also restrict the type and amounts of data that can be accessed by the users. Additionally, existing technologies fail to provide an interactive system to solve a problem or to search information relating to a specific domain. Further, the existing technologies do not provide any analytical solution of the data available across different servers within an organization and are not compatible with third party database servers.

SUMMARY

A method for integrating semantic search, query, and analysis across heterogeneous data types includes a data management computing apparatus for searching by a across a plurality of different heterogeneous data indexes based on portions of one or more search keywords in response to a received request. A result set for each of the plurality of different heterogeneous data indexes is obtained based on the searching by the data management computing apparatus. Further, one or more facets to each of the obtained results sets are added by the data management computing apparatus. Furthermore, a plurality of visualization techniques are automatically identified by the data management computing apparatus for each of the obtained results sets based on the facets in each of the obtained result sets and a model entity type associated with each of the plurality of different heterogeneous data indexes. Finally, each of the obtained results sets with the added facets and the identified one of the plurality of visualization techniques is provided by the data management computing apparatus.

A non-transitory computer readable medium having stored thereon instructions for integrating semantic search, query, and analysis across heterogeneous data types comprising machine executable code which when executed by at least one processor, causes the processor to perform steps including searching by a across a plurality of different heterogeneous data indexes based on portions of one or more search keywords in response to a received request. A result set for each of the plurality of different heterogeneous data indexes is obtained based on the searching. Further, one or more facets to each of the obtained results sets are added. Furthermore, a plurality of visualization techniques are automatically identified for each of the obtained results sets based on the facets in each of the obtained result sets and a model entity type associated with each of the plurality of different heterogeneous data indexes. Finally, each of the obtained results sets with the added facets and the identified one of the plurality of visualization techniques is provided.

A data management computing apparatus including one or more processors, a memory coupled to the one or more processors which are configured to execute programmed instructions stored in the memory including searching by a across a plurality of different data indexes based on portions of one or more search keywords in response to a received request. A result set for each of the plurality of different heterogeneous data indexes is obtained based on the searching. Further, one or more facets to each of the obtained results sets are added. Furthermore, a plurality of visualization techniques are automatically identified for each of the obtained results sets based on the facets in each of the obtained result sets and a model entity type associated with each of the plurality of different heterogeneous data indexes. Finally, each of the obtained results sets with the added facets and the identified one of the plurality of visualization techniques is provided.

This technology provides a number of advantages including providing more effective methods, non-transitory computer readable media, and apparatuses for integrating semantic search, query, and analysis across heterogeneous data types. This technology more effectively guides users to the information that they are seeking. Additionally, this technology provides answers to questions that were previously unanswerable via traditional business intelligence and reporting tools applications. This technology also helps find unforeseen relationships in data and business processes that can lead to innovative solutions and better dissemination of knowledge.

Another advantage of this technology is that it executes and manages searches like a conversation. This technology is able to suggest, refine, relate, and educate a user during the search process. Additionally, this technology may provide feedback so that the process of searching provides the right answer or helps to change the question that is being searched. By adding the context of the application, as well as data about who the user is and how that user is currently interacting with the application, this technology can suggest a different question before it is even asked or add specific search terms to the question as it is being asked based on to add more granularity to the results.

Yet another advantage of this technology is that it continuously collects and indexes more heterogeneous data than existing technologies which allows more data to be mined and searched over time. Additionally, by using a number of well-defined search paradigms, such as tagging, faceting, and text indexing, this technology helps users mine heterogeneous data more effectively to solve complex questions or problems easily and efficiently. Further, by extending traditional techniques for searching and combining those techniques with access to analytics and the existing capabilities of the underlying graph database, this technology is able to identify unforeseen scenarios buried within the captured heterogeneous data.

DETAILED DESCRIPTION

Figure 1:
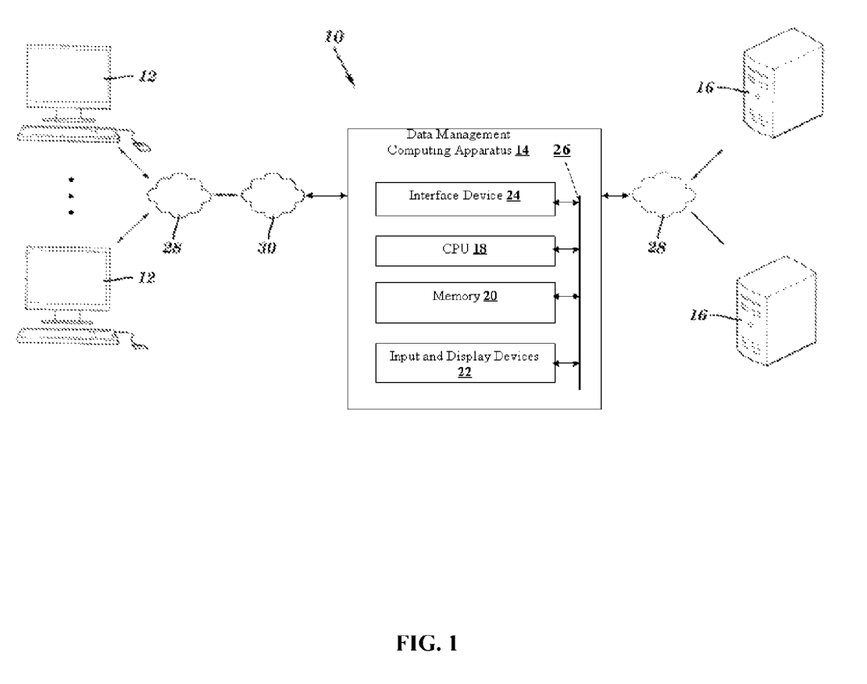
FIG. 1 is a block diagram of a network environment with an exemplary data management computing apparatus for integrated search, query, and analysis across heterogeneous data types.

A network environment 10 with a data management computing apparatus 14 for integrated search, query, and analysis across heterogeneous data types is illustrated in FIG. 1. The environment 10 includes the data management computing apparatus 14, a plurality of client computing devices 12, and a plurality of data servers 16 which are coupled together by the Local Area Network (LAN) 28 and Wide Area Network (WAN) 30, although the environment 10 can include other types and numbers of devices, components, elements, databases and communication networks in other topologies and deployments. While not shown, the exemplary environment 10 may include additional components, such as routers, switches and other devices which are well known to those of ordinary skill in the art and thus will not be described here. This technology provides a number of advantages including providing more effective methods, non-transitory computer readable media, and apparatuses for integrating semantic search, query, and analysis across heterogeneous data types.

The data management computing apparatus 14 provides a number of functions including integrating semantic search, query, and analysis across heterogeneous data types and systems, although other numbers and types of systems can be used and other numbers and types of functions can be performed. The data management computing apparatus 14 includes at least one processor 18, memory 20, input and display devices 22, and interface device 24 which are coupled together by bus 26, although data management computing apparatus 14 may comprise other types and numbers of elements in other configurations.

Processor(s) 18 may execute one or more non-transitory programmed computer-executable instructions stored in the memory 20 for the exemplary methods illustrated and described herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2A:
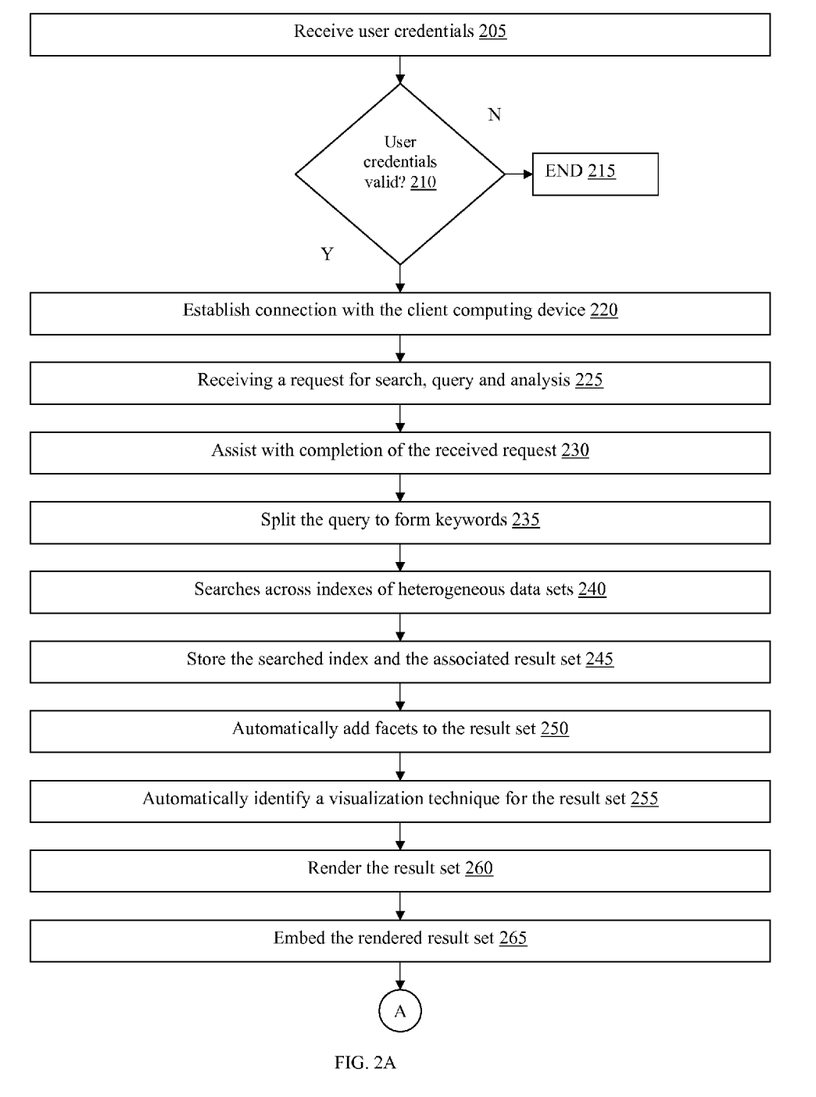
FIG. 2A-2B are flowcharts of an exemplary method for performing integrated search, query, and analysis across heterogeneous data types.
Figure 2B:
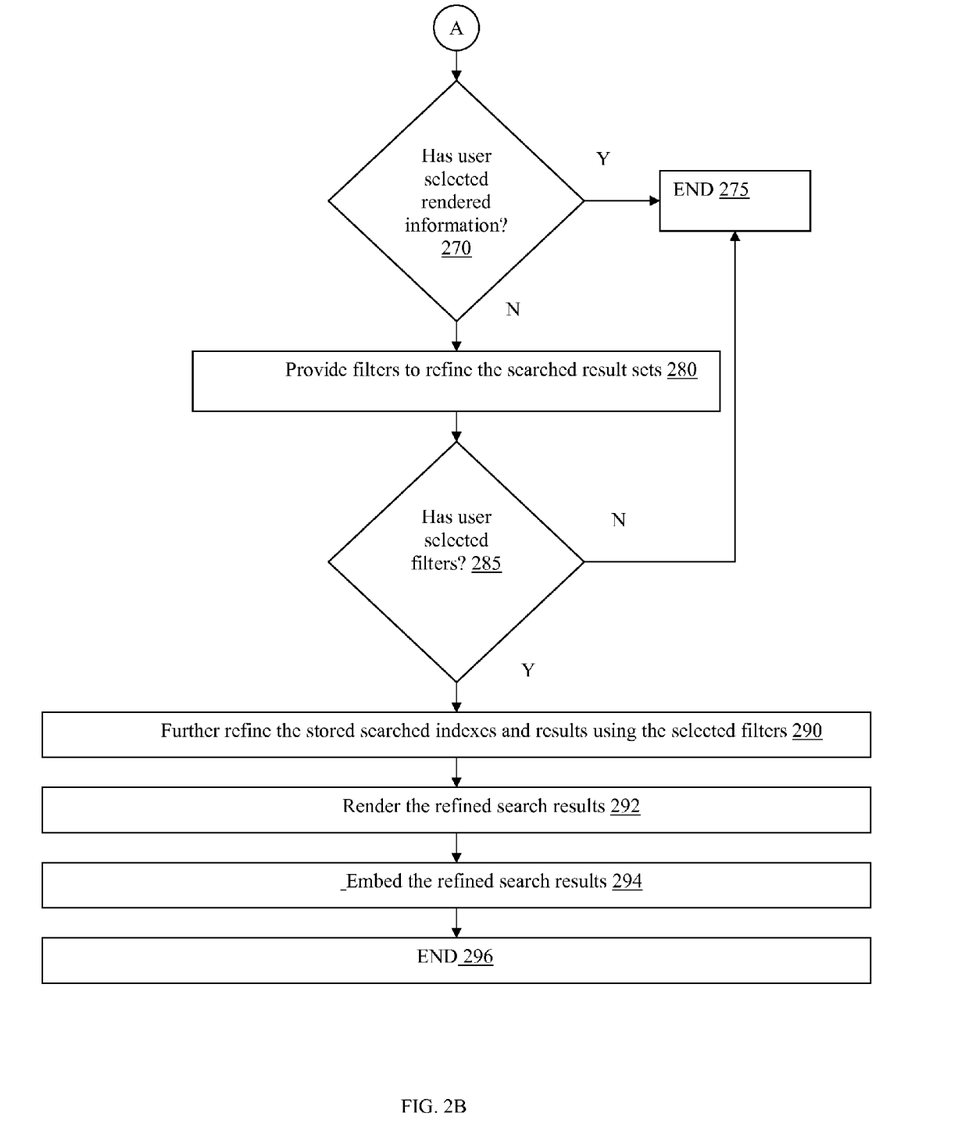

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flowchart shown in FIGS. 2A-2B are representative of example steps or actions of this technology that may be embodied or expressed as one or more non-transitory computer or machine readable instructions stored in memory 20 that may be executed by the processor(s) 18.

Input and display devices 22 enable a user, such as an administrator, to interact with the data management computing apparatus 14, such as to input and/or view data and/or to configure, program and/or operate it by way of example only. Input devices may include a touch screen, keyboard and/or a computer mouse and display devices may include a computer monitor, although other types and numbers of input devices and display devices could be used. Additionally, the input and display devices 22 can be used by the user, such as an administrator to develop applications using Application interface.

The interface device 24 in the data management computing apparatus 14 is used to operatively couple and communicate between the data management computing apparatus 14, the client computing devices 12, and the plurality of data servers which are all coupled together by LAN 28 and WAN 30. By way of example only, the interface device 24 can use TCP/IP over Ethernet and industry-standard protocols, including NFS, CIFS, SOAP, XML, LDAP, and SNMP although other types and numbers of communication protocols can be used.

Each of the client computing devices 12 includes a central processing unit (CPU) or processor, a memory, an interface device, and an I/O system, which are coupled together by a bus or other link, although other numbers and types of network devices could be used. The client computing device 12 communicates with the data management computing apparatus 14 through LAN 28, although the client computing device 12 can interact with the data management computing apparatus 14 in other manners.

Each of the plurality of data servers 16 includes a central processing unit (CPU) or processor, a memory, an interface device, and an I/O system, which are coupled together by a bus 26 or other link, although other numbers and types of devices and systems could be used. Each of the plurality of data servers 16 enters, updates and/or store content, such as files and directories, although other numbers and types of functions can be implemented and other types and amounts of data could be entered, updated, or stored used. Each of the plurality of data servers 16 may include by way of example only, enterprise resource planning (ERP) systems, portals and related technologies, traditional business intelligence systems and manufacturing intelligence systems. Additionally, the plurality of data servers 16 can include real time information of devices or resources executing.

Although an exemplary environment 10 with the client computing devices 12, the data management computing apparatus 14 and the plurality of data servers 16 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

This technology defines a rapid, iterative approach to design and deployment, allowing solutions to be delivered incrementally, shortening the time to first value. This system's unique model-based design and development tools enable developers to build and deploy operational solutions in less time than traditional approaches.

The software platform described by this system defines a model driven development architecture in which the model has entities, which typically represents physical assets/devices, computer applications and systems, and people. Entities can also represent data objects and platform services. Each entity has its own properties and services, and can fire and consume events. All entities are treated as equal collaborators in any applications that utilize the underlying capabilities of the system.

Within this system, developers model the Things (people, systems and real world equipment/devices) in their world, independent of any specific use case. Things are augmented projections of their real world equivalents containing the complete set of data, services, events, historical activities, collaboration, relationships and user interfaces that define it and its place in the world. These Things can then be easily combined into solutions, tagged and related into industrial social graphs, searched/queried/analyzed, and mashed up into new operational processes.

This system enables applications that are 'dynamic' in that they continuously evolve and grow over time. As the application runs, it continuously collects and indexes new data about the entities in the model, which allows more data to be mined and searched over time. This system's unique technology provides the basis for this evolution, allowing users to answer questions, solve problems, and capture opportunities that have not even been anticipated. This exemplary technology increases in value the more it is used.

An exemplary apparatus and method, referred to herein as Search, Query, and Analysis (SQUEAL), is provided that allows users to: utilize built-in application and user context to guide users to the information that they are seeking; provide answers to questions that were previously unanswerable via traditional BIRT (Business Intelligence and Reporting Tools) applications; help users find unforeseen relationships in their data and business processes that can lead to innovative solutions and better spread of knowledge; and integrate search, collaboration, and analytical applications.

SQUEAL addresses both the Known-Unknown and the Unknown-Unknown domains. This technology utilizes a user defined model that follows a specific set of rules. Therefore, this exemplary technology can know how different model elements will be related and stored. Using a number of well-defined search paradigms, such as tagging, faceting, and text indexing, this technology helps users solve the Known-Unknown questions. Basic relationships can be traced in the system because of their definition within the model.

The more difficult solution is to enable users to advance to the Unknown-Unknown realm. The next level of value comes from being able to answer questions that are not answerable by direct connections between entities. Extending traditional techniques for search, and combining those techniques with access to analytics and the existing capabilities of the underlying graph database, offer the ability to identify unforeseen scenarios buried within the captured data.

Because SQUEAL can be used in the Unknown-Unknown realm, it is expected that relationships between data and new solutions for innovation and problem solving will result, as the unintended consequence of asking a question and seeing an unforeseen answer.

One of the benefits of examples of this technology is that it can use search like a conversation. Since all entities in the system are able to 'converse', making devices, sensors, systems and people equal participants in the process, search can be viewed as a conversation between user and engine. The system is able to suggest, refine, relate, and educate the user during the search process. The engine should provide feedback so that the process of searching provides the right answer, or helps to change the question that is being asked. By adding the context of the application, as well as who the user is and how that user is currently interacting with the application, this exemplary technology can suggest a different question before it is even asked—or add specific search terms to the question as it is being asked based on the user context, to add more granularity to the results.

As this exemplary technology suggests new solutions or paths, the user walks through a discovery path that is more complex and rich than a simple full text search.

A discovery path may be saved for future use. The discovery path may be kept private or shared with other users of the system. Each discovery path will have a "breadcrumb trail" marking the stops and turns of the path and any breadcrumb can be "pinned" to represent a returnable end point.

The ultimate goal is to make search ubiquitous within the system's collaboration and analytical applications. Traditional BIRT applications have been designed to answer specific questions. Examples are a report that summarizes yesterday's production output in a manufacturing plant, or last month's sales orders for a company. These applications provide analytics against well-defined data structures and well-defined semantic models that describe the data. They cannot adopt on the fly to user interaction and questioning. Even the output that is rendered to the end user follows a specific pattern.

Using search in a new way, with the help of the model, the user experience for consuming information can be entirely new. A user will be able to ask a question of the system, and a set of results can be presented that will include analytics, Mashups, and documents. The data can be part of the system's model or may point to data in an external store (Document management system, database application, or ERP application, for example).

There are multiple implementations within the system that enable search. These implementations will allow specific linkages between the system's model artifacts/content and search results. These include the following four implementations:

First, all data within the system can be tagged to add context. This includes design time data (the model), as well as runtime data that is collected within the scope of the customer applications. Tags can be dynamic. For example, you may have changing lot numbers in a manufacturing line. You can collect time series data against the machines on the line. When different material lots are moving through the line, you can tag the time series data with the lot numbers, for easy retrieval, correlation and analysis later.

Second, all text fields will be fully indexed by the search engine for reference. This includes model data, and run time data, and human collaboration data such as from operator or maintenance logs.

Third, the model is based on a graph database, with explicit relationships defined as part of the model. Relationships can be parent-child or sibling. A refrigerated truck implements a Thing Template that represents two Thing Shapes, a truck and a refrigerated cargo carrier. A user can ask the model to search for all Things that implement the Refrigerated_Truck Thing Template, and get a list of specific trucks in return. Relationship terms can be user defined, such as Vessel1 "feeds" Vessel2. Relationships apply to both design time and run time data, because the run time data is collected against, and is hence related to, an entity defined in the model. There is always a relationship between data collection and entities.

Fourth, external data can be "crawled" and indexed to be included as part of the search results along with a pointer to the actual document. These indexes of external data can also be tagged, using vocabularies, to add context to the search in relation to a user's query. Each of these implementations can be leveraged to provide a new experience for the data consumer.

When a search is performed, faceted results will automatically offer analytical applications based on the search results. This is possible because of the knowledge the SQUEAL application will have of the model defined within the system. Examples are: (1) Time series charts for stream data; (2) Full analytical applications for Mashups; and (3) Heat Maps and physical location maps for geotagged data.

Collaboration results will be treated similarly to analytical applications. Collaboration Mashups will be presented for search results that point to: (1) Blogs; (2) Forums; and (3) Wikis.

Interactive chat sessions can be automatically established for anything within a search result set that has a facet of Machine/RAP, where RAP is the system's Remote Application Proxy connector to a machine or device that is capable of supporting chat functionality.

Using contextualized search based on the user role and the application that the user is in, including any selections the user may have made within the application, the search results can be directed to specific types of analysis. Combining all these elements into a single user experience is the definition of SQUEAL.

An important capability of SQUEAL will be the ability to simultaneously search across many servers/data stores. For example, a manufacturing company will typically have many locations. A server may be deployed at each location, or in some companies, on a regional basis. Each server will collect their own data. If a maintenance worker at one plant site searches for a solution to a specific machine problem at his site, he may wish to search across each site within the company. That will require a simultaneous search across many servers, with the results aggregated and shown as a single search result.

Combining search and analytical solutions is a unique approach to managing and gaining knowledge from the large amount of data flows that are the result of the Internet of Things (JOT). SQUEAL is a single tool rather than the traditional split of the query and analytical solutions available today.

Using Mashup tagging to add to search terms allows web pages, mini-web applications, and other HTML artifacts to be included in the results of a SQUEAL inquiry.

A user who is working within an application that supports the user workflow may also have search embedded within the application. The application may have specific terms embedded that are automatically appended to the search, allowing the application itself as designed by the content developer to add search context. For example, this allows a content developer to specify "maintenance" or "maintenance procedure" so that a search within the maintenance application has pre-defined context.

Using Mashup faceting to have specific facets as the result of a search is a new approach to the search user experience. For example, this allows the content developer within a Mashup to define a specific search facet, such as analytical trends, so that a search within that Mashup will always have a category of analytical trends in the results.

The user context can be added to the search context, so that the selections that the user has made along the way in the Mashups may be added to the search terms.

Embedded search capability within a Mashup, as opposed to standalone search pages, contributes to delivering search and analytical results in a new way to the user, within normal work flow applications.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for integrating semantic search, query and analysis across heterogeneous data will now be described with reference to FIGS. 1 and 2A-2B. In step 205, the user of the client computing device 12 enters the credentials to login to an application executing on a client computing device 12, although the user may login to the executing application on the client computing device using any other methods. By way of example only, the executing application can be relating to HTML and/or Java Script applications running in the web browser of the client computing device 12, although the executing application can be any other applications on the client computing device 12.

In step 210, the client computing device 12 verifies the entered user credentials with the information stored within the memory, although the client computing device 12 can verify the user credentials using any other means or methods. If the client computing device 12 successfully verifies the user credentials, a Yes branch is taken to step 220 to provide access to use the executing one or more application, otherwise, a No branch to step 215 is taken to reject the login request and close the executing application on the client computing device 12.

In step 220, upon successful login of the user to the executing application on the client computing device 12, the client computing device 12 establishes a connection with the data management computing apparatus 14 via LAN 28 or WAN 30, although the client computing device 12 may establish a connection with the data management computing apparatus even before the successful login of the user to the executing application on the client computing device 12 using any other means. Additionally, the client computing device 12 sends the application information including, application name, application version along with the user credentials to the data management computing apparatus 14.

In step 225, the data management computing apparatus 14 receives a request from an application executing in the requesting client computing device 12 for search, query and analysis, although the data management computing apparatus 14 can receive any other types of requests in other manners from other devices or systems. Along with the request, the data management computing apparatus 14 receives at least a portion of a complete request from the requesting client computing device 12, although the data management computing apparatus 14 may receive the complete request from the requesting client computing device 12. By way of example only, the request is entered one character at a time in a help text field of the executing application in the client computing device 12, although the request could be entered in other manners, such as a being entered by pasting in and complete word or phrase. In this step, as each character is entered the client computing device 12 transmits the entered character to the data management computing apparatus 14, although the portions or all of the characters in the request can be provided in other manners, such as when each word of a search phrase is entered by way of example only. In this particular example, the request from the client computing device 12 is a query requesting information within the executing application in the client computing device 12, although other types and numbers of requests could be entered.

In step 230, the data management computing apparatus 14 utilizes stored information in the memory 20 about previous frequently asked questions, search terms and recent search results which includes the entered character(s) to automatically assist in completion of the query or can add context to the query prior to searching based on parameters, such as type of the executing application, geographical location of the requesting client computing device 12 or role of the user using the executing application, the requesting client computing device 12, although the data management computing apparatus 14 can assist at other times and use any other parameters to assist in completion of the request or adding context to the user request. In this example, the data management computing apparatus 14 obtains the role of the user using the requesting client computing device 12 when the user logs-in to at least one of the executing one or more applications, although the data management computing apparatus 14 can obtain any additional information. Additionally, the data management computing apparatus 14 also refines during the completion of the query based on previous top searches, highly rated search stored within the memory 20, although the data management computing apparatus 14 may refine the query based on any other parameters.

In step 235, the data management computing apparatus 14 splits the received query into keywords by splitting the words in the received query separated by blank spaces, although the data management computing apparatus 14 may split the received query into keywords using any other techniques. Optionally, the data management computing apparatus 14 may also refer to a dictionary stored within the memory 20 while splitting the received query into keywords. Additionally, while splitting the received query into keywords, the data management computing apparatus 14 ignores any articles such as a, the; and/or special characters, such as a comma, period, exclamatory mark, semi-colon, or question mark by way of example. Further, in this example, the data management computing apparatus 14 may choose to ignore numerical characters in the received query, although the data management computing apparatus 14 may consider the numerical character while splitting the received query into keywords. By way of example only, if the received query is "What is the temperature of the machine?" then the data management computing apparatus 14 splits the received query into keywords such as temperature, machine and ignore the question mark within the query.

In step 240, the data management computing apparatus 14 searches across indexes of heterogeneous data sets stored in the plurality of data servers 16 using the keywords formed in step 235 in real time to identify and obtain result sets associated with the keywords, although the data management computing apparatus 14 can search heterogeneous data sets using any other methods or techniques stored at any other memory location. By way of example only, the heterogeneous data includes structured data, unstructured data, third party indexes and time series data stored in the plurality of data servers 16, although other types and amounts of data at different locations can be searched. By searching across the indexes using the keywords, this technology provides quick and accurate searching across heterogeneous data as the keywords are searched across the indexes as opposed to searching across the actual data, although the entire data set could be searched. The data management computing apparatus 14 searches across indexes of heterogeneous data sets to obtain results sets relating to the received request, although the data management computing apparatus 14 can search the heterogeneous data sets for any other purpose. By way of example only, the result sets includes time series data with explicit values, unstructured data such as blog entries, forum discussions, information present on pages of web sites, structured data results from third party systems such as a knowledge management system and also data from transactional system such as work order execution or production order details.

In step 245, the data management computing apparatus 14 synchronously stores the searched indexes and the associated result sets with the searched indexes within the memory 20, although the data management computing apparatus 14 may store any other additional information associated with the searched indexes at any other memory location. Additionally, in this example, the data management computing apparatus 14 stores the searched indexes and the associated result sets with time stamp within the memory 20. By way of example only, the data management computing apparatus 14 stores the searched indexes and the associated result sets in a table, which maps the indexes with the associated result sets, although the data management computing apparatus 14 can store the searched index and the associated data in any other format.

In step 250, the data management computing apparatus 14 automatically adds facets for each of the result set. By way of example only, the data management computing apparatus 14 add the facets present in the plurality of data servers 16 based on a model-entity type, although the data management computing apparatus 14 can add the facets based on any other parameters stored at any other memory locations. In this technology, facets relates properties of the information in the result set which are dynamically derived and added by analysis of the result set obtained in step 240, although facets can include additional information and performing operations such as, classification of each information of the result set along multiple explicit dimensions which enables the information of the result set to be accessed and ordered in multiple ways rather than in a single, pre-determined, taxonomic order as done in the existing technologies. By way of example only, facets include time series charts for stream data, full analytical trends for mash-ups or heat maps or physical location maps for geo-tagged data. By automatically adding facets to the search results, the technology disclosed in this patent application provides benefits and advantages such as classifying information and finding data accurately. Additionally, as it would be appreciated by a person having ordinary skill in the art, model-entity type in this technology relates to an interfacing relationship between the results sets and the facets.

In step 255, the data management computing apparatus 14 automatically suggests visualization techniques to result sets and the facets based on model-entity type, although the data management computing apparatus 14 can automatically suggest visualization techniques based on any other parameters. In this technology, visualization techniques relate to techniques of representing data as a web page view, although visualization techniques can include representing data in any other format suitable for convenient viewing of the. By way of example only, examples of visualization techniques include web page view, print views, representing data as charts or graphs, although visualization techniques can include any other techniques of representing data. In this example, the data management computing apparatus 14 suggests the visualization techniques by referring to a table present within the memory 20. The table in the memory 20 includes the keywords, facets and their associated visualization techniques, although the table can include any other amounts additional information.

In step 260, the data management computing apparatus 14, the data management computing apparatus 14 renders the result sets as they are being searched. In this example, rendering relates to loading the searched result sets in the format they were searched and stored, although the results sets can be converted by the data management computing apparatus 14 to a standard format suitable to the executing application on the requesting client computing device 12. By way of example only, formats can be in a PDF, textual format or an image format, although other formats can be used.

In step 265, the data management computing apparatus 14 embeds the rendered result set with the associated facets and the visualization techniques within the work flow of the executing application on the requesting client computing device 12, although the data management computing apparatus 14 can output the rendered information to the requesting client computing devices using other techniques. Additionally, in this example, the data management computing apparatus 14 can also embed interactive chat functionality within the work-flow of the executing application in the requesting client computing device 12. The interactive chat functionality could assist the user of the requesting client computing device 12 to interact with subject matters experts or other professionals to find any additional information relating to the received request, although the chat functionality could provide any additional assistance. By embedding the rendered result set with the associated facets and the visualization techniques within the work flow, the technology provided in this patent application provides advantages to the user of requesting client computing device 12 to view all the rendered data within the executing application as opposed to switching between multiple screens to view different data.

In step 270, the data management computing apparatus 14 determines if the rendered result set is selected by the requesting client computing device 12 for further viewing. If the data management computing apparatus 14 determines that the rendered information is selected by the requesting client computing device 12, then the Yes branch is taken to step 275 where this exemplary method ends. If data management computing apparatus 14 determines that the rendered information is not selected, then the No branch is taken to step 280.

In step 280, the data management computing apparatus 14 provides one or more filters to the requesting client computing device 12 to further refine the rendered result set, although the data management computing apparatus 14 can assist in refining the search information using any methods. The data management computing apparatus 14 provides the filters based on the executing application in the client computing device 12, the received request in step 225, or user role, although the data management computing apparatus 14 can provide the filters based on other types and amount of criteria or other parameters. The filters provided by the data management computing apparatus 14 may be used to refine the result set to make the search more accurate.

In step 285, the data management computing apparatus 14 determines if the requesting client computing device 12 has selected any of the provided filters. If the data management computing apparatus 14 determines that the requesting client computing device 12 has not selected one or more of the provided filters, then the No branch is taken to step 275 where this exemplary method ends.

If in step 285 the data management computing apparatus 14 determines that the requesting client computing device 12 has selected one or more of the provided filters, then the Yes branch is taken to step 290. In step 290, the data management computing apparatus 14 refines the search by further searching the stored indexes and the associated result set in step 245 using the selected filters, although the data management computing apparatus 14 can refine the stored results using the updated keywords by any other techniques or methods. In another example, the data management computing apparatus 14 may perform a new search using the updated keywords and the flow of the process may flow back to step 240.

Next, in step 292, the data management computing apparatus 14 renders the refined search results as illustrated in step 260. The refined search results include the result set, and the associated facets and the visualization techniques, although the refined search results may include any amounts of any additional information.

Further, in step 294, the data management computing apparatus 14 embeds the refined result set, the facets and the visualization techniques as illustrated in step 265 and the flow of the process ends in step 296.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

The invention claimed is:

1. A method for integrating semantic search, query, and analysis across data sets associated with a plurality of monitored physical assets, the method comprising:
presenting, via a graphical user interface, an input field for a search engine that accesses, in a single search, a plurality of indexes generated from data sets associated with a plurality of monitored physical assets, wherein the search engine accesses, in the same single search, run-time data and design-time data of a model of a monitored physical asset of the plurality of monitored physical assets,
wherein the design-time data comprises graph-database elements comprising one or more model templates used to define the monitored physical asset, wherein a model template includes one or more attributes of the monitored physical asset including properties associated with the monitored physical asset, and
wherein the run-time data comprises specific properties for the monitored physical asset implemented from the one or more model templates;
receiving, in the input field of the graphical user interface, one or more search keywords;
in response to receiving the one or more search keywords, searching, by a computing device, across the plurality of indexes to determine i) one or more result sets for each of the plurality of indexes having matched portions of the one or more search keywords to the run-time data and ii) one or more result sets having matched portions of the one or more search keywords to the graph-database elements of the design-time data; and
presenting, via the graphical user interface, i) graphical objects associated with the one or more result sets associated with each matched monitored physical asset of the plurality of monitored physical assets, results associated with one or more matched properties of the run-time data, and results associated with one or more matched properties of the design-time data, and ii) graphical objects associated with one or more filters to refine the searched results.

2. The method of claim 1, further comprising,
in response to receiving a filter of the one or more filters, applying, by the computing device, the received one or more filters to the obtained results sets to provide a corresponding refined results set; and
presenting, via the graphical user interface, graphical objects associated with the refined result sets.

3. The method of claim 1, wherein the one or more filters includes a search facet.

4. The method of claim 3,
wherein the search facet includes a category of analytic trends for analysis of the one or more result sets.

5. The method of claim 3, wherein at least one of the search facets is selected from the group consisting of a time series chart, a full analytical trend chart, a Mashup, a heat map, and a physical location map.

6. The method of claim 1, further comprising:
identifying, by the computing device, an applicable visualization techniques for each of the results sets based on a given property or a given model entity type to which each of the one or more results sets is associated,
wherein the graphical objects associated with the one or more result sets are presented in accordance with the identified visualization techniques.

7. The method of claim 6, wherein the identified visualization technique are selected from the group consisting of a web page view, a graph, a chart, and a printable view.

8. The method of claim 1, wherein the obtained results sets are graphically presented, via a single application, on a computing device associated with a user.

9. The method of claim 1, wherein the data sets are heterogeneous data sets selected from the group consisting of data sets from an Enterprise Resource Planning (ERP) system, data sets from a Manufacturing Intelligence system, and data sets from a Business Intelligence system.

10. The method of claim 1, wherein the model template further comprises services and events associated with the given monitored physical asset, and wherein the search across the plurality of indexes includes a search to determine one or more result sets having matched portions of one or more services or events.

11. The method of claim 1, wherein a set of the results includes analytics, Mashup, and documents.

12. The method of claim 1, wherein the data sets include tagged data.

13. The method of claim 1, wherein the data sets include structured data, unstructured data, and time series data.

14. A system comprising:
a processor; and
a memory having instructions, stored thereon, wherein execution of the instructions, cause the processor to:
present, via a graphical user interface, an input field for a search engine that accesses, in a single search, a plurality of indexes generated from data sets associated with a plurality of monitored physical assets, wherein the search engine accesses, in the same single search, run-time data and design-time data of a model of a monitored physical asset of the plurality of monitored physical assets,
wherein the design-time data comprises graph-database elements comprising one or more model templates used to define the monitored physical asset, wherein a model template includes one or more attributes of the monitored physical asset including properties associated with the monitored physical asset, and wherein the run-time data comprises specific properties for the monitored physical asset implemented from the one or more model templates;
receive, in the input field of the graphical user interface, one or more search keywords;
in response to receiving the one or more search keywords, direct a search, by a computing device, across the plurality of indexes to determine i) one or more result sets for each of the plurality of indexes having matched portions of the one or more search keywords to the run-time data and ii) one or more result sets having matched portions of the one or more search keywords to the graph-database elements of the design-time data; and
present, via the graphical user interface, i) graphical objects associated with the one or more result sets associated with each matched monitored physical asset of the plurality of monitored physical assets, results associated with one or more matched properties of the run-time data, and results associated with one or more matched properties of the design-time, and ii) graphical objects associated with one or more filters to refine the searched results.

15. The system of claim 14, wherein the instructions, when executed by the processor, further cause the processor to:
   in response to receiving a filter of the one or more filters, direct application by the computing device of the received one or more filters to the obtained results sets to provide a corresponding refined results set; and
   present, via the graphical user interface, graphical objects associated with the refined result sets.

16. The system of claim 14, wherein the filters include a search facet.

17. The system of claim 14, wherein the instructions, when executed by the processor, further cause the processor to:
   direct identification, by the computing device, an applicable visualization techniques for each of the results sets based on a given property or a given model entity type to which each of the results sets is associated, wherein the graphical objects associated with the one or more result sets are presented in accordance with the identified visualization techniques.

18. The system of claim 17, wherein the identified visualization technique are selected from the group consisting of a web page view, a graph, a chart, and a printable view.

19. The system of claim 14, wherein the model template further comprises services and events associated with the given monitored physical asset, and wherein the search across the plurality of indexes includes a search to determine one or more result sets having matched portions of one or more services or events.

20. A non-transitory computer readable medium having instructions stored thereon, wherein execution of the instructions by a processor, cause the processor to:
   present, via a graphical user interface, an input field for a search engine that accesses, in a single search, a plurality of indexes generated from data sets associated with a plurality of monitored physical assets, wherein the search engine accesses, in the same single search, run-time data and design-time data of a model of a monitored physical asset of the plurality of monitored physical assets,
      wherein the design-time data comprises graph-database elements comprising one or more model templates used to define the monitored physical asset, wherein a model template includes one or more attributes of the monitored physical asset including properties associated with the monitored physical asset, and wherein the run-time data comprises specific properties for the monitored physical asset implemented from the one or more model templates;
   receive, in the input field of the graphical user interface, one or more search keywords;
   in response to receiving the one or more search keywords, direct a search, by a computing device, across the plurality of indexes to determine i) one or more result sets for each of the plurality of indexes having matched portions of the one or more search keywords to the run-time data and ii) one or more result sets having matched portions of the one or more search keywords to the graph-database elements of the design-time data; and
   present, via the graphical user interface, i) graphical objects associated with the one or more result sets associated with each matched monitored physical asset of the plurality of monitored physical assets, results associated with one or more matched properties of the run-time data, and results associated with one or more matched properties of the design-time data, and ii) graphical objects associated with one or more filters to refine the searched results.

* * * * *